United States Patent [19]
Saurwein et al.

[11] Patent Number: 5,143,296
[45] Date of Patent: Sep. 1, 1992

[54] PNEUMATIC SPRAY GUN

[75] Inventors: A. G. Saurwein, Kent; Ronald L. Rivers, Auburn, both of Wash.

[73] Assignee: PMC, Inc., Sun Valley, Calif.

[21] Appl. No.: 657,562

[22] Filed: Feb. 19, 1991

[51] Int. Cl.$^5$ .......................... B05B 7/04; B05B 7/08; B05B 7/12
[52] U.S. Cl. .................. 239/415; 239/419.3; 239/422; 239/427.5; 239/428; 239/DIG. 8
[58] Field of Search .................. 239/415, 419.3, 422, 239/427.5, 428, DIG. 8

[56] References Cited

U.S. PATENT DOCUMENTS

| | | | |
|---|---|---|---|
| 3,126,157 | 3/1964 | Dickerson | 239/415 |
| 3,685,743 | 8/1972 | Sebastiani | 239/415 |
| 3,709,468 | 1/1973 | Ives | 366/339 |
| 3,790,030 | 2/1974 | Ives | 239/112 |
| 4,529,126 | 7/1985 | Ives | 239/112 |
| 4,760,956 | 8/1988 | Mansfield | 239/419.3 |
| 4,967,956 | 11/1990 | Mansfield | 239/419.3 |
| 5,064,120 | 11/1991 | Luttrell, Jr. | 239/DIG. 8 |

OTHER PUBLICATIONS

Venus, H.I.S. Systems Instruction Manual, 1984, 78 pages.
Venus-Gusmer folder, 1990, 6 pages.

Primary Examiner—Andres Kashnikow
Assistant Examiner—Lesley D. Morris
Attorney, Agent, or Firm—Christensen, O'Connor, Johnson & Kindness

[57] ABSTRACT

A pneumatic spray gun (10) having a mixing assembly (14) including a resin valve (18) and a catalyst valve (20) formed by valve passages (44,46) formed in a valve rotor (36). A pneumatic trigger assembly (24) and slide assembly (28) control rotation of the valve rotor to open the resin valve momentarily before the catalyst valve. A distribution plate (174) distributes the catalyst within the resin before the mixture flows into a mixer (22).

37 Claims, 11 Drawing Sheets

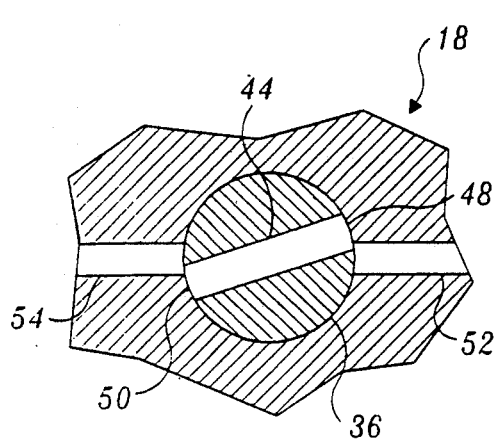 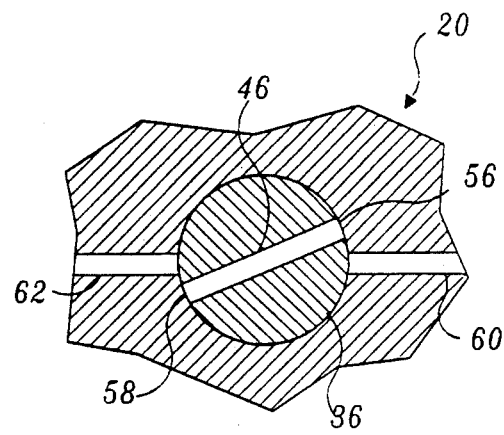
FIG.8A.   FIG.8B.
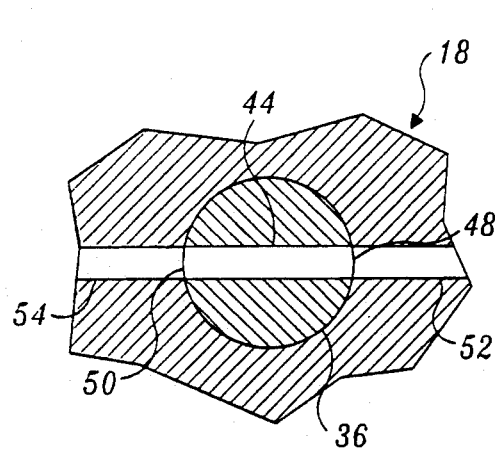 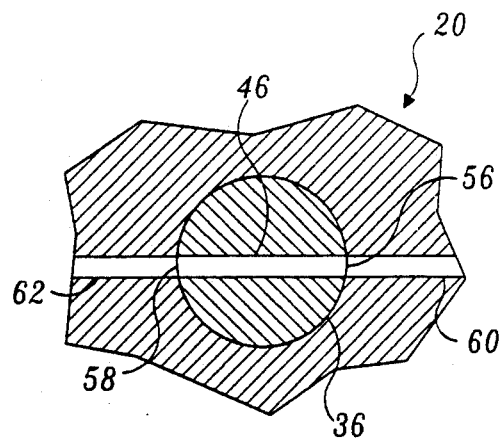
FIG.9A.   FIG.9B.

PNEUMATIC SPRAY GUN

TECHNICAL FIELD OF THE INVENTION

The present invention relates to a mixing apparatus for mixing and discharging first and second fluids, and more particularly to a spray gun for mixing a first fluid stream with a second fluid stream, and even more particularly to a pneumatically operated spray gun having rigidly interconnected first and second valves for starting the flow of a resin stream prior to the flow of a hardener or catalyst stream for mixing and discharging.

BACKGROUND OF THE INVENTION

Hand-held spray guns are conventionally used for receiving two chemically reactive fluids, mixing the fluids internally to the gun, and discharging the fluid mixture onto a work piece. Spray guns are often used in the manufacture of fiber-reinforced resin articles, such as boat hulls, bathtubs, automobile body components, machinery housings and furniture. The spray gun receives a resin stream and a polymerization catalyst or hardener stream, mixes the two streams together in a mixer and discharges the mixed stream concurrent with a spray of chopped glass fibers to deposit a mixture of the resin mixture and fiber on a work surface. The resin system used will vary on the exact application and properties desired. Examples include polyester resin and catalyst systems or epoxy resin and hardener systems.

Typically, polyester resin systems require a significantly higher portion of resin than hardener. Generally the hardener comprises less than 5% of the weight of the mixture, and often between ½ and 3%. An exact ratio mix is important to assure proper strength, hardness, and other properties of the cured resin. One type of conventional spray gun utilizes two needle valves corresponding to the resin and catalyst streams that are opened sequentially in an attempt to assure the proper resin/catalyst ratio. Each needle valve includes a plunger having a stem on which a stop may be adjustably positioned. Depression of a trigger on the gun to start the spray results in a lever extension portion of the trigger impacting the stops to open the needle valves. The resin needle valve stop can be positioned closer to the trigger lever extension portion to open the resin needle valve slightly before the catalyst needle valve, starting the flow of the resin through the gun first. This prevents the catalyst from flooding rapidly from the catalyst needle valve into the mixer, in higher than proper proportion to the resin, which would result in depletion of pressure on the catalyst supply line. This initial catalyst-rich mix ratio would be followed by a catalyst-poor mix ratio as the resin begins to flow while the pressure rebuilds in the catalyst line.

When properly adjusted to provide staggered resin and catalyst valve opening, such conventional guns provide improved control over resin/catalyst mix ratios. However, the staggered valve-opening gun described above must be readjusted periodically to maintain the proper valve opening sequence, due to the tendency of the valve stops to shift out of position during use. Additionally, the mechanism described in the above conventional gun utilizes several parts to link the opening of the resin and catalyst valves. This linkage of separate parts is subject to wear and breakage, as well as requiring occasional readjustment.

In contrast to the high polyester resin to catalyst mix ratios described above, other types of resin systems require different ratios. For example, many epoxy resin and hardener systems require a significantly lower ratio of resin to hardener, such as a one-to-one ratio of resin to hardener. While it may not be necessary to stagger the opening of resin and hardener valves in a gun discharging this type of resin system, it is desirable to have resin and hardener valves that are reliably linked for concurrent opening without requiring maintenance and periodic readjustment of a mechanically complex linkage consisting of separate parts.

For all types of resin systems, it is desirable to have as efficient a mixing of the resin and catalyst or hardener as possible to provide the most uniform properties in the cured product.

An additional drawback of conventional guns is the gradual wear of valve seat surfaces and mixer surfaces within the gun over time. Valves worn to the point of leakage or a mixer that loses efficiency due to wear may necessitate replacement of the entire gun at relatively high expense.

Spray guns for fiber-reinforced resin systems often include a glass-strand chopper mounted to the spray gun. Squeezing a spring-biased trigger on the spray gun starts the discharge of a spray of chopped fiber simultaneously with the discharge of the mixed resin and hardener. With some conventional guns, it is possible to depress the trigger only partially, in which case mixed resin and hardener flow but the spray of chopped fibers is not started. The spraying of mixed resin and hardener without fiber is desirable in some applications, such as applying a smooth gel coat or resin coatings to the exterior surface of a resin and glass layup. However, with conventional guns, it is difficult to maintain the trigger in such a position due to resistance offered by the trigger and the inability to define the intermediate position at which resin mixture flows but chopped glass does not.

SUMMARY OF THE INVENTION

The present invention provides a pneumatic spray gun to overcome the limitations of the above-discussed conventional types of spray guns. The spray gun includes a hand-held housing, rigidly interconnected first and second valves to control the flow of first and second fluids, respectively, a control mechanism associated with the first and second valves for opening the first valve to start flow of the first fluid stream and for delayed opening of the second valve to start flow of the second fluid stream after flow of the first fluid stream has started, and a mixer to mix the first and second fluid streams to discharge a mixed fluid stream.

In a preferred embodiment of the present invention, the spray gun includes a valve rotor rotatably mounted within the housing and including first and second valve passages formed diametrically through the valve rotor. Each of the first and second valve passages includes an inlet port and an outlet port that are positionable by rotation of the valve rod for fluid communication with corresponding fluid supply and discharge passages. The first and second valve passages are parallel to each other, and the first valve passage has a cross-sectional area that is greater than that of the second valve passage. The valve rotor is nominally disposed in an off position in which the first and second valve passages are both misaligned with their respective fluid supply and fluid discharge passages to prevent flow of both the first and second fluid streams.

The valve rotor is rotatable from the off position through an intermediate position, in which the first valve passage is partially aligned with the first fluid supply and discharge passages to start the flow of the first fluid stream, while the second valve passage remains closed. The valve rotor is further rotatable to an on position, in which both the first and second valve passages are aligned with the corresponding fluid supply and discharge passages to permit flow of both the first and second fluid streams. Thus the present invention provides a mechanism to delay the start of flow of the second fluid stream, such as a catalyst, until after the start of the first fluid stream, such as a resin having a greater volumetric flow rate. This delayed start of the catalyst flow prevents initial dissipation of catalyst pressure and disproportionate mixing of the resin and catalyst components. Further, the first and second valves are rigidly mechanically interconnected by virtue of the valve rotor including first and second valve passages. The rigid interconnection of the valves assures that the valves do not become unadjusted during use, always providing the desired sequential opening. The rigid valve interconnection is simple and reliable, eliminating the need for periodic adjustment and maintenance, and decreasing wear and breakage of that part of the gun.

In an additional aspect of the present invention, for resin systems having differing ratios, different valve rotors may be utilized with correspondingly dimensioned first and second valve passages. For resin systems having an approximate equal ratio of resin to catalyst or hardener, such as some epoxy/hardener systems, the cross-sectional area of the first and second valve passages is the same so that the first and second valve open simultaneously with rotation of the valve rotor.

In a further aspect of the present invention, a mechanism is included for rotating the valve rotor between the on and off positions. In one preferred embodiment of the invention, the spray gun includes a trigger that controls the communication of a pneumatic supply with chambers formed in the spray gun to rotate the valve rotor. The spray gun includes a pneumatic slide chamber and a slide piston slidably disposed within the slide chamber to separate the slide chamber into a first slide chamber portion and a second slide chamber portion. An elongate link member has a first end connected radially to the valve rotor and a second end that projects through a slot formed transversly through the slide piston, such that slidable movement of the slide piston within the pneumatic slide chamber from side to side rotates the valve rotor between the on position and the off position, passing through the intermediate position therebetween.

To actuate movement of the slide piston, the pneumatic trigger is mounted on the projecting end of an actuating piston that is slidably inserted within an actuating chamber that is in pneumatic communication with the pneumatic supply. The actuating chamber includes first and second actuating ports disposed in pneumatic communication with the first and second slide chamber portions, respectively, of the slide chamber portion. The actuating piston is positionable to place one or the other of the actuating ports in pneumatic communication with the pneumatic supply. When the trigger is in the off position, the pneumatic supply is placed in pneumatic communication with the first slide chamber portion to maintain the valve rotor in the off position. Depression of the trigger moves the actuating piston to place the pneumatic supply in pneumatic communication with the second slide chamber portion to force the slide piston towards the opposite end of the slide chamber and rotate the valve rotor through the intermediate position and to the on position.

In a further aspect of the present invention, a detent mechanism on the trigger enables the trigger to be maintained in the on position. Further depressing the trigger sufficiently to overcome the force of the detent mechanism allows the trigger to be further depressed towards a full-stop position. In the full-stop position of the trigger, the pneumatic supply is placed in pneumatic communication with a glass-strand chopper to initiate discharge of chopped glass fiber to meld with the mixed fluid stream discharging from the spray gun. The present invention thus enables pneumatic actuation of the first and second valves in a staggered fashion, with the first valve opening before the second valve, and further provides a means to reliably hold the trigger in a position for discharge of the mixed fluid only without the addition of chopped glass fibers.

In a further aspect of the present invention, the spray gun includes a fluid distribution mechanism disposed between the first and second valves and the spray gun mixer to distribute the second fluid into the first fluid prior to entering the mixer, thus affording a more efficient mixing of the two fluids. In a preferred embodiment, the fluid distribution mechanism comprises a distribution plate through which is formed a central passage. A plurality of secondary passages are formed through the distribution plate and are disposed circumferentially around the central passage. The first fluid stream flows through the first valve and then through the secondary passages formed in the distribution plate into a distribution chamber disposed between the distribution plate and the mixer. A plunger-type injector is mounted within the central passage, and when the second valve is opened the pressure of the second fluid stream is sufficient to open the injector by separating the injector plunger from a mating surface on the central passage, permitting flow of the second fluid stream through the central passage into the distribution chamber. The first and second fluid streams enter the distribution chamber in two symmetrical, concentric streams to distribute the second fluid within the first fluid prior to entry into the mixing apparatus.

In a further aspect of the present invention, the gun is constructed in a modularized fashion, so that the mixer, valve block, pneumatic slide chamber and trigger assemblies can be disassembled. This allows for simple replacement of worn components, and for reconfiguration of the spray gun to handle different resin systems.

BRIEF DESCRIPTION OF THE DRAWINGS

The present invention will be readily understood by those of ordinary skill in the art upon reading the following specification in conjunction with the appended drawings, in which:

FIGS. 8A and 8B show cross-sectional views of the first valve passage and second valve passage, respectively, corresponding to FIGS. 7A and 7B but with the valve rotor rotated to the intermediate position to permit fluid flow through the first valve passage;

FIGS. 9A and 9B show cross-sectional views of the first and second valve passages, respectively, corresponding to FIGS. 8A and 8B but with the valve rotor rotated to the on position;

DETAILED DESCRIPTION OF THE PREFERRED EMBODIMENTS

Figure 1:
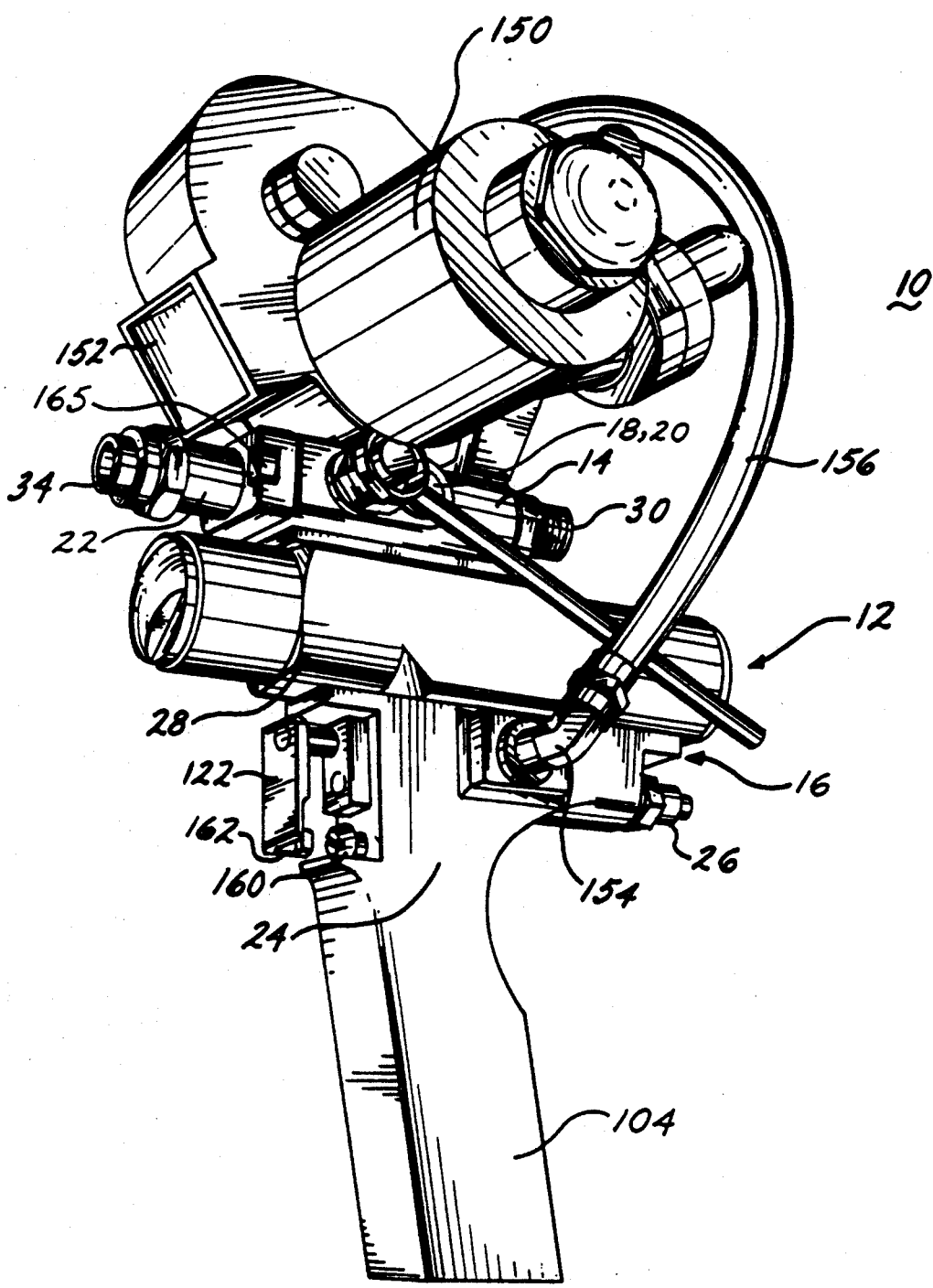
FIG. 1 shows a pictorial view of a preferred embodiment of a spray gun constructed in accordance with the present invention.
Figure 11:
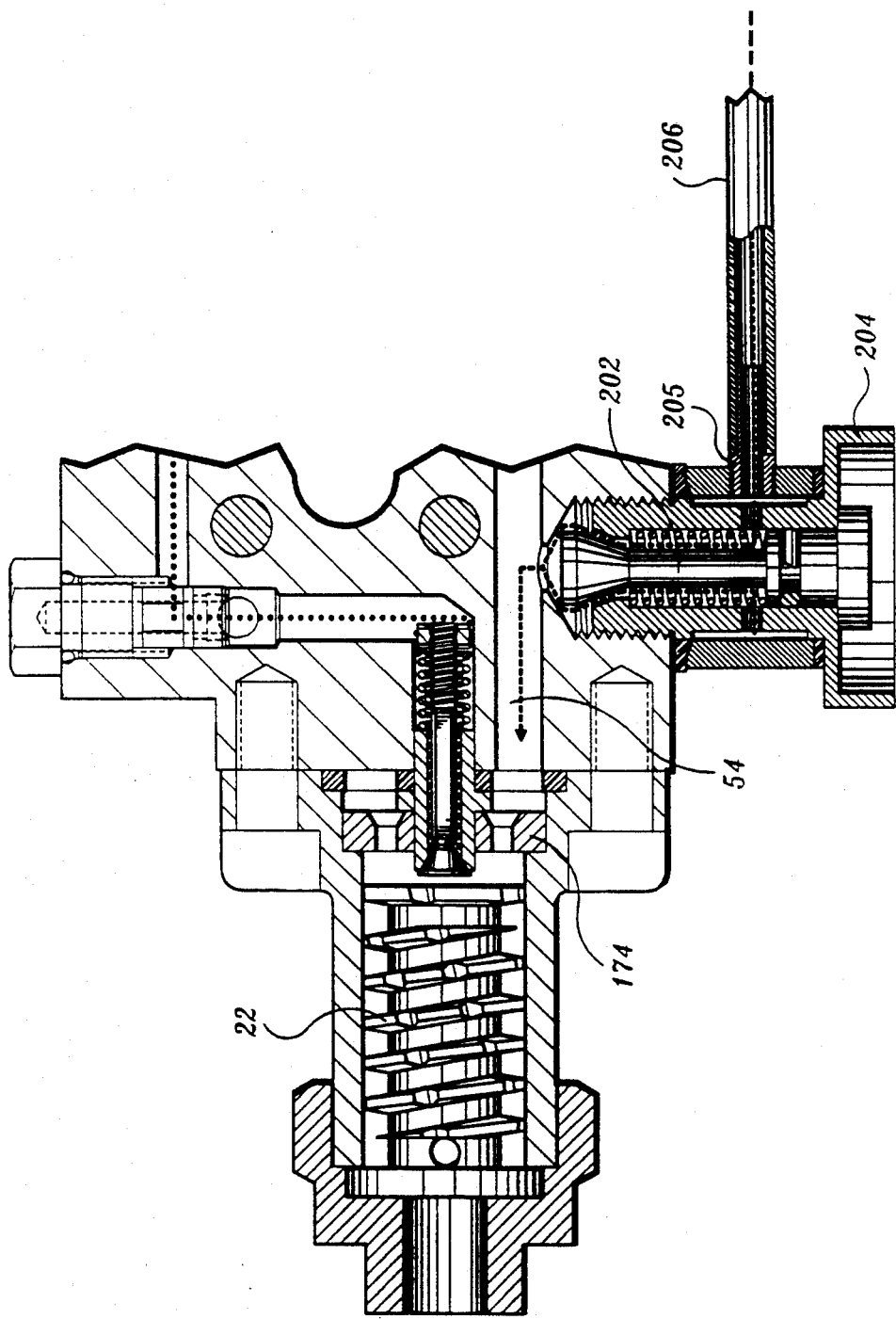
FIG. 11 shows a top elevation cross-sectional view corresponding to FIG. 10 but with the first and second valves closed and the solvent flush valve opened to clean the mixer and distribution chamber.
Figure 12:
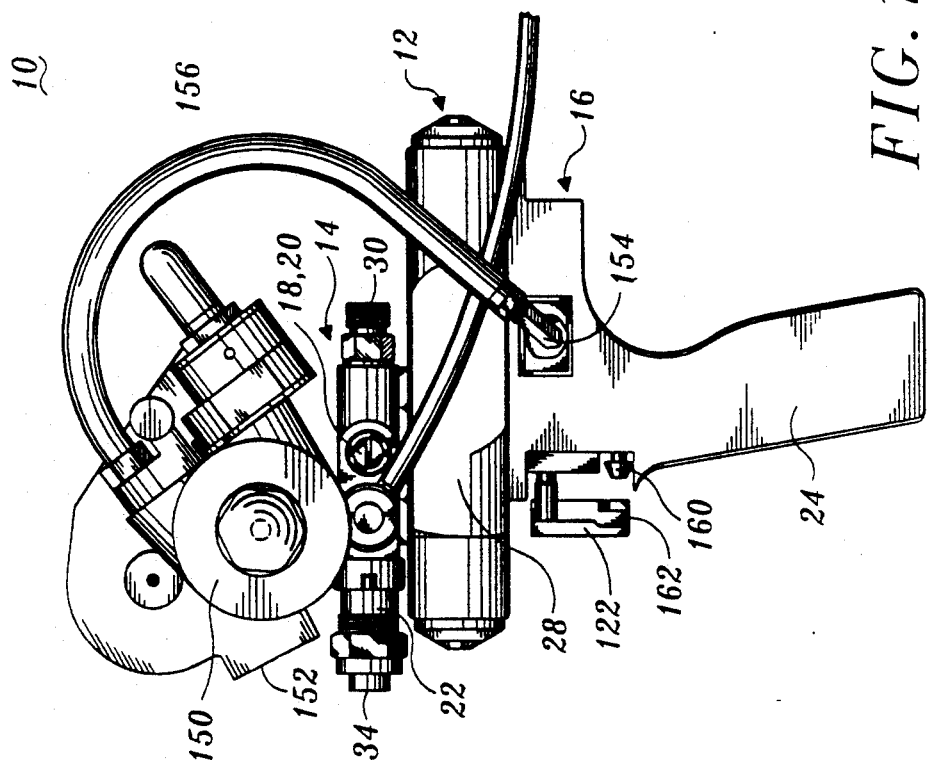
FIG. 12 shows a side elevation view of the spray gun shown in FIG. 1.

A preferred embodiment of a spray gun 10 constructed in accordance with the present invention is illustrated in FIGS. 1-12. Referring to FIGS. 1 and 12, the spray gun 10 includes a housing 12 including a valve and mixing assembly 14 connected to a control assembly 16. The valve and mixing assembly 14 includes a resin valve 18 rigidly interconnected to a catalyst valve 20 for controlling the flow of a resin stream and a catalyst stream, respectively, and a mixer 22 for mixing the resin stream and the catalyst stream to discharge a mixed fluid stream. The control assembly 16 enables the resin valve to open momentarily before the catalyst valve when flow of resin and catalyst is started through the gun, ensuring a proper initial mix ratio.

Although the spray gun 10 may be used for mixing other two-part fluid mixtures, such as adhesives or paint, it is particularly well suited for mixing thermosetting resins and catalysts, such as a polyester resin and a catalyst as used in manufacturing fiber reinforced resin structures. As used in this specification, resin shall refer to the fluid component requiring the largest volumetric flow rate, typically a polyester resin. The term "catalyst" is used for the agent which causes the resin to polymerize and requires a much smaller volumetric flow rate through the spray gun. The fluid mixture of the resin and catalyst will be referred to as resin mixture. Typically the catalyst comprises from ½ to 3% by weight of the resin mixture.

Although the preferred embodiment of the spray gun 10 constructed in accordance with the present invention is described in terms of a resin and catalyst system, it should be understood that the present invention is also suitable for use with other resin systems. For instance, epoxy resin and hardener systems are well suited for use in a gun constructed in accordance with the present invention. The ratio of epoxy resin to hardener may vary from ratios in the order of 10:1 to 1:1. As shall be described subsequently, guns can be constructed similarly to the spray gun 10, to handle these different resin systems by changing the configuration of the resin valve 18 and catalyst valve 20 to provide the proper mix ratio. Thus the term "resin mixture" should be understood to include other mixed resin systems, and the terms "resin" and "catalyst" are not intended to limit the use of a spray gun constructed in accordance with the present invention to polyester resin and catalyst systems, which are described for purpose of illustration only.

Referring still to FIG. 1, the control assembly 16 includes a trigger assembly 24 that operates to control the pneumatic communication of a pneumatic supply, such as a compressor (not shown). The pneumatic supply connects to a pneumatic fitting 26 mounted on the trigger assembly 24 and communicates with a pneumatic slide assembly 28 included in the control assembly 16 to operate the valves 18 and 20.

Referring to FIG. 1, the end of the spray gun 10 including the pneumatic fitting 26, a resin supply fitting 30, and a catalyst supply fitting (not shown) shall be referred to as the rearward end of the spray gun. The opposite end of the spray gun, including a nozzle 34 from which the resin mixture is discharged, shall be referred to as the forward end of the spray gun.

Figure 2:
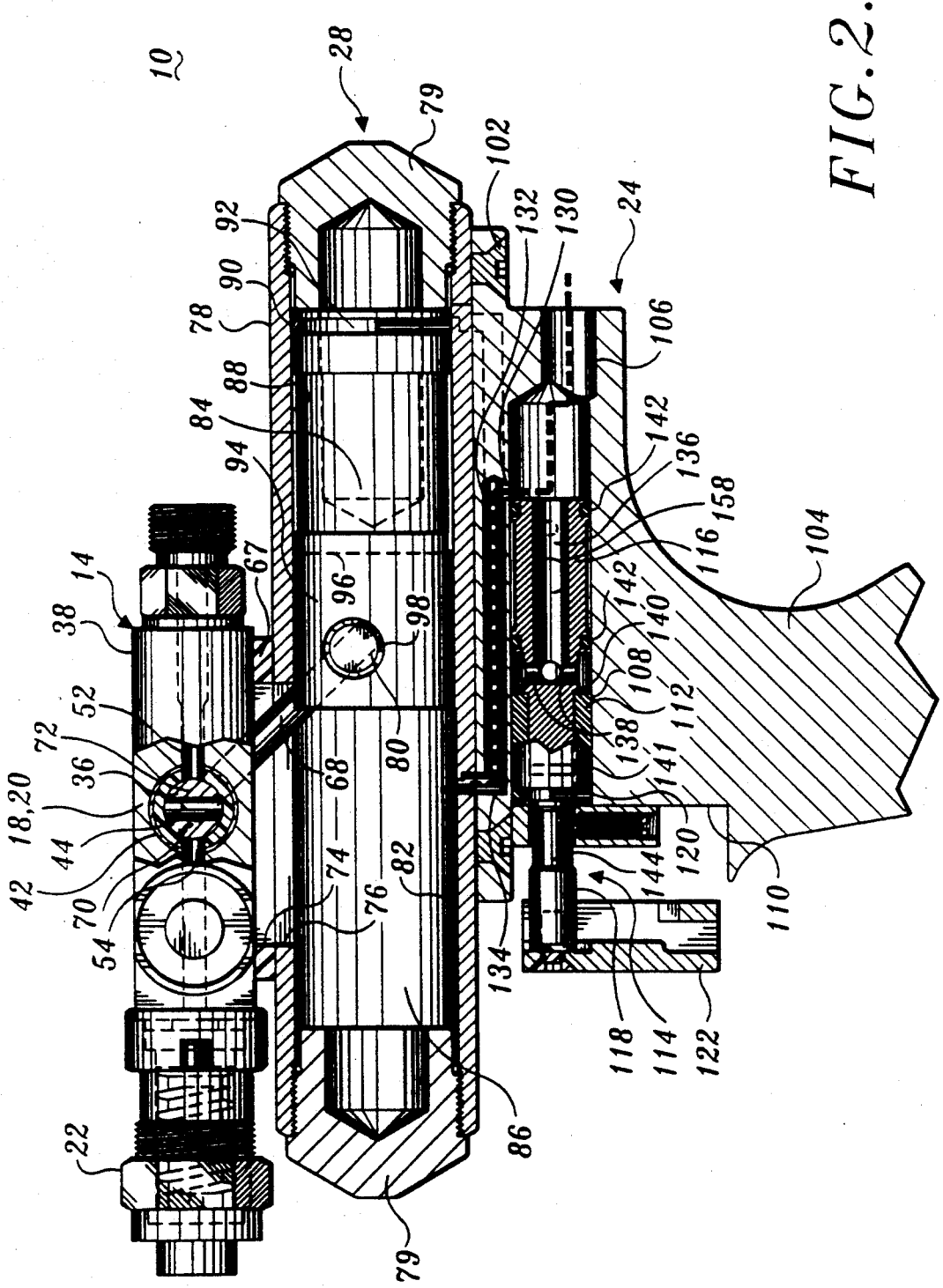
FIG. 2 provides a side elevation partial cross-sectional view of the spray gun of FIG. 1 configured in the off position.
Figure 5:
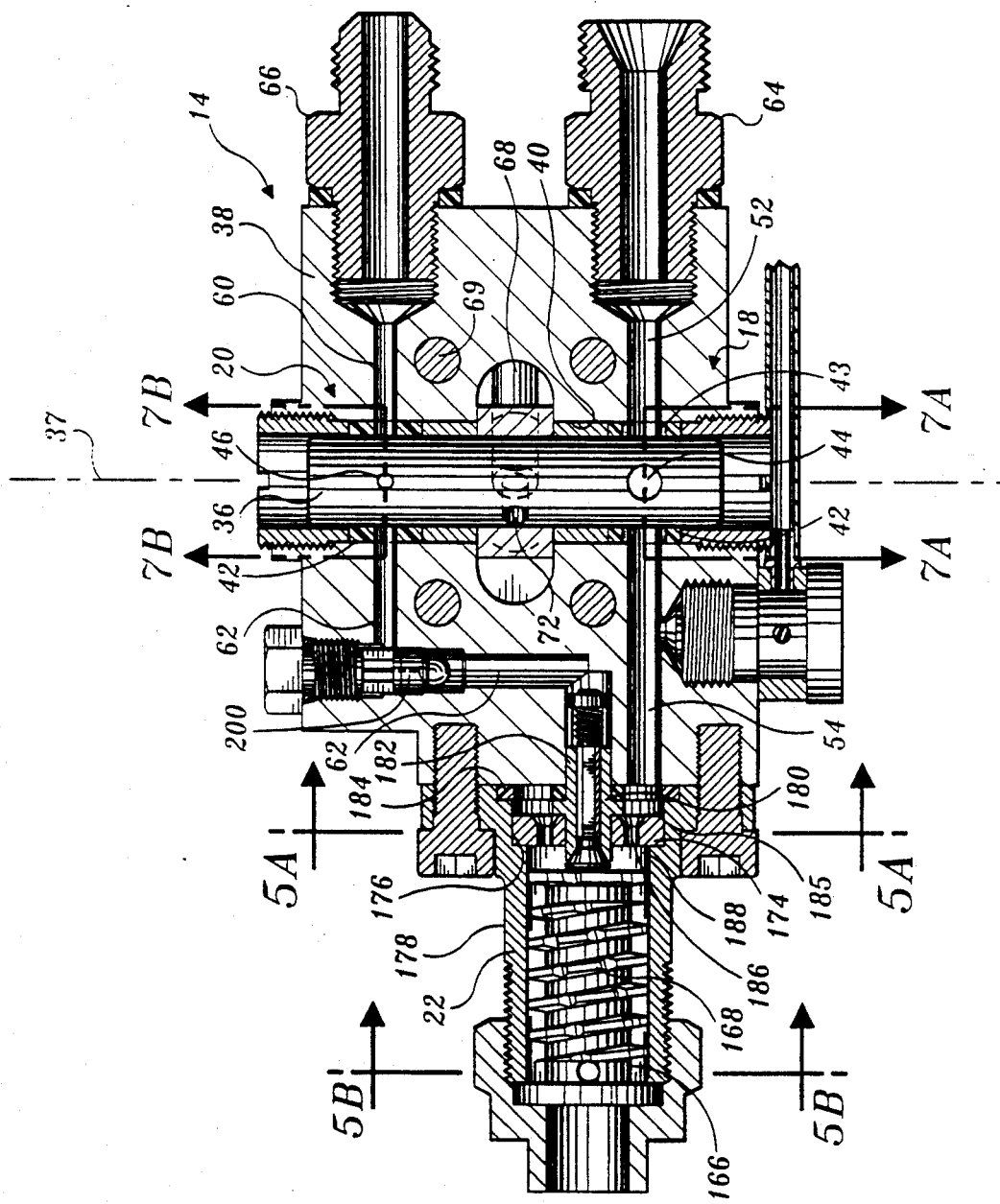
FIG. 5 shows a top elevation partial cross-sectional view of the valve and mixing assembly, with the rotor valve configured in the closed position.

Reference is now had to FIGS. 2 and 5 to explain the construction of the resin valve 18 and catalyst valve 20 included in the valve and mixing assembly 14 and configured to enable the resin valve 18 to open momentarily before the catalyst valve 20. In the preferred embodiment illustrated, this is accomplished through the use of a valve rotor 36 mounted transversely and rotatably within a passage 40 formed in a valve block 38. In the current embodiment, the valve rotor 36 is configured as a cylindrical rod that rotates within a plurality of annular seals 42 sealing the clearance between the rotor 36 and the passage 40. The seals 42 are ideally constructed from a low friction material, such as polytetrafluoroethylene. The valve rotor 36 functions to rigidly interconnect the valves 18 and 20 in a relative position corresponding to the desired order of opening of the valves.

To form the resin and catalyst valves 18 and 20, the valve rotor 36 includes a resin valve passage 44 and a catalyst valve passage 46 that are each formed through the valve rotor 36 transversely with respect to the rotational axis 37 of the valve rotor 36. Mechanically stable washers 43 are disposed over the valve rotor on either side of the resin valve passage 44 to protect the adjacent seals 42.

Figures 7A, 7B:
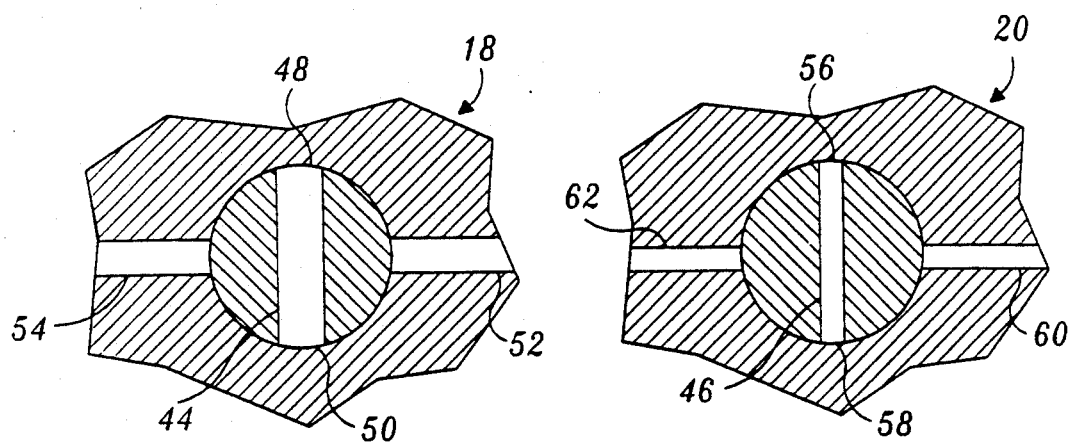
FIG. 7A shows a cross-sectional view of the first valve passage shown misaligned with the first fluid supply and discharge passages when the valve rotor is rotated to the closed position, taken substantially along the line 7A—7A of FIG. 5.
FIG. 7B provides a cross-sectional view of the second valve passage when the valve rotor is configured as in FIG. 7A, taken substantially along the line 7B—7B of FIG. 5.
Figure 10:
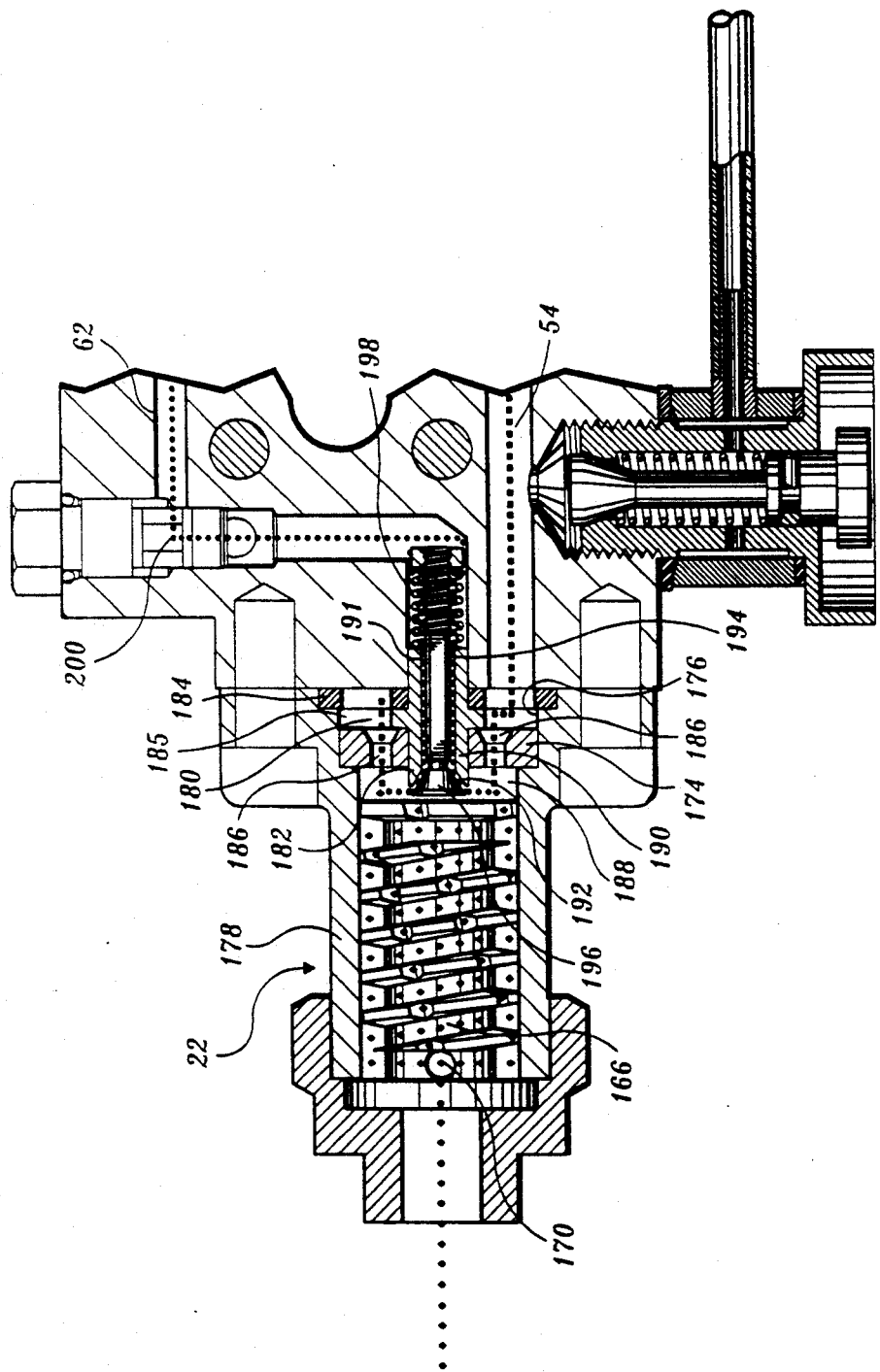
FIG. 10 provides a top elevation partial cross-sectional view of the valve and mixing assembly demonstrating the flow of the resin and catalyst through the distribution plate and turbulent mixer.

Referring to FIGS. 5 and 7A, the resin valve passage 44 includes an inlet port 48 and an outlet port 50 that are positionable by rotation of the valve rotor 36 to align with a resin supply passage 52 and a resin discharge passage 54, respectively, formed in the valve block 38. A conventional fitting 64 is secured to the valve block 38 to connect a resin supply line (not shown) to the resin supply passage 52 within the valve block 38.

Referring to FIGS. 5 and 7B, the catalyst valve passage 46 includes a catalyst inlet port 56 and a catalyst outlet port 58 that are positionable by rotation of the valve rotor 36 to align with a catalyst supply passage 60 and a catalyst discharge passage 62, respectively, formed within the valve block 38. A conventional fitting 66 is secured to the valve block 38 to attach a catalyst supply line (not shown) in fluid communication with the catalyst supply passage 60.

In accordance with a preferred embodiment of the present invention, the resin and catalyst valve passages 44 and 46 and corresponding supply and discharge passages within the valve block 38 are configured to enable at least partial alignment of the resin valve passage 44 with the corresponding resin supply and discharge passages 52 and 54 prior to any alignment of the catalyst valve passage 46 with the catalyst supply and discharge passages 60 and 62. In the preferred embodiment illustrated in FIG. 5, this is accomplished by positioning the longitudinal axes of the resin supply and discharge passages 52 and 54 and catalyst supply and discharge passages 60 and 62 along a plane that includes the rotational axis 37 of the valve rotor 36. Further, the resin valve passage 44 and catalyst valve passage 46 are formed diametrically through the valve rotor 36, the longitudinal axes of the passages 44 and 46 being parallel to each other and oriented perpendicularly with respect to the rotational axis 37. The cross-sectional area of the resin valve passage 44 is greater than the cross-sectional area of the catalyst valve passage 46 to accommodate the greater volumetric flow of the resin through the valve block 38 that is required for proper mixing of the resin and catalyst. Correspondingly, the cross-sectional area of the resin supply and discharge passages 52 and 54 are larger than the cross-sectional area of the catalyst supply and discharge passages 60 and 62.

Reference is now had to FIGS. 7A through 9B to explain the operation of the resin and catalyst valves 18 and 20. FIGS. 7A, 8A and 9A illustrate the resin valve 18 in off, intermediate, and on positions, respectively. FIGS. 7B, 8B, and 9B illustrate the catalyst valve 20 in off, intermediate, and on positions, respectively. Referring first to FIGS. 7A and 7B, when the valve rotor 36 is disposed in the off position (as in FIG. 2), the resin and catalyst valve passages 44 and 46 are oriented perpendicular to and nonaligned with the corresponding resin and catalyst supply and discharge passages 52, 54, 60, and 62.

As the valve rotor 36 is rotated to the on position, clockwise about the rotational axis 37 of the valve rotor 36, the resin valve 18 opens partially while the catalyst valve 20 remains closed as shown in FIGS. 8A and 8B. In this intermediate position, the inlet and outlet ports 48 and 50 of the resin valve passage 44 are partially aligned with the resin supply and discharge passages 52 and 54, respectively, of the valve block 38. However, in the same position, the inlet and outlet ports 56 and 58 of the catalyst valve passage 46 are still nonaligned with the catalyst supply and discharge passages 60 and 62. At this point, flow of the resin stream through the spray gun is started while the catalyst stream is still prevented from flowing.

As the valve rotor 36 is further rotated to the on position, as shown in FIGS. 9A and 9B, the inlet and outlet ports 48 and 50 of the resin valve passage 44 are fully aligned with the resin supply and discharge passages 52 and 54, respectively. At the same time, the inlet and outlet ports 56 and 58 of the catalyst valve passage 46 are fully aligned with the catalyst supply and discharge passages 60 and 62, respectively, enabling flow of both the resin and the catalyst streams.

Reference is now had to FIG. 2 to explain the control mechanism for rotation of the valve rotor 36. The valve block 38 is mounted above the slide assembly 28 of the spray gun 10. A gasket 67 is captured between the valve block 38 and the slide assembly 28 to form an airtight seal therebetween. Referring to FIG. 5, the valve block 38 is detachably secured to the slide assembly 28 by screws 69 or other conventional fasteners. Referring again to FIG. 2, an elongated linkage member 68 has an upper end 70 that is threadedly secured radially into a corresponding threaded receptacle passage 72 formed diametrically through the valve rotor 36, as can also be seen in FIG. 5. The connection of the linkage member 68 to the valve rotor 36 is also shown in FIG. 6.

Figure 6:
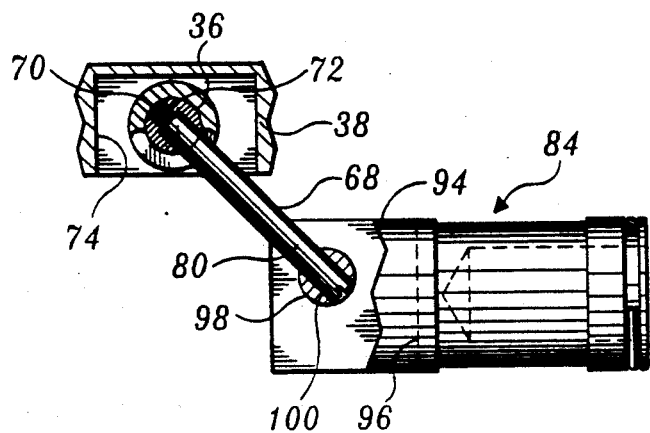
FIG. 6 shows a pictorial view of the slide piston and linkage member connected to the valve rotor (shown in cross section)

Referring to FIGS. 2 and 6, the valve block 38 includes a slot 74 formed below the valve rotor 36 and extending both forwardly and rearwardly of the valve rotor 36. The slide assembly 28 is formed from an elongate cylindrical slide barrel 78 capped by front and rear end caps 79 to form a cylindrical slide chamber 82. The slot 74 in the valve block 38 aligns with a corresponding slot 76 formed in the top of the cylindrical barrel 78 of the slide assembly 28. The lower end 80 of the linkage member 68 projects downwardly from the valve rotor 36 through the aligned slots 74 and 76 into a cylindrical slide chamber 82 formed within the slide barrel 78. A slide piston 84 is mounted within the slide chamber 82 to slide between a forward slide chamber portion 86 and a rearward slide chamber portion 88. A seal such as an O-ring 90 is fitted within a groove 92 formed around the outside diameter of the slide piston 84 to seal with the slide chamber 82. A slight flat is formed across the bottom of the forward end 94 of the slide piston 84 to allow airflow throughout the chamber 82 except as prevented by the O-ring 90.

The forward end 94 of the slide piston 84 is bifurcated by a transverse slot 96, as shown in FIG. 6. Referring still to FIG. 6, a pin 98 is rotatably mounted through the bifurcated forward end 94 of the slide piston 84 transversely with respect to the transverse slot 96. The lower end 80 of the linkage member 68 extends into the transverse slot 96 and through a hole 100 formed diametrically through the pin 98.

Figure 3:
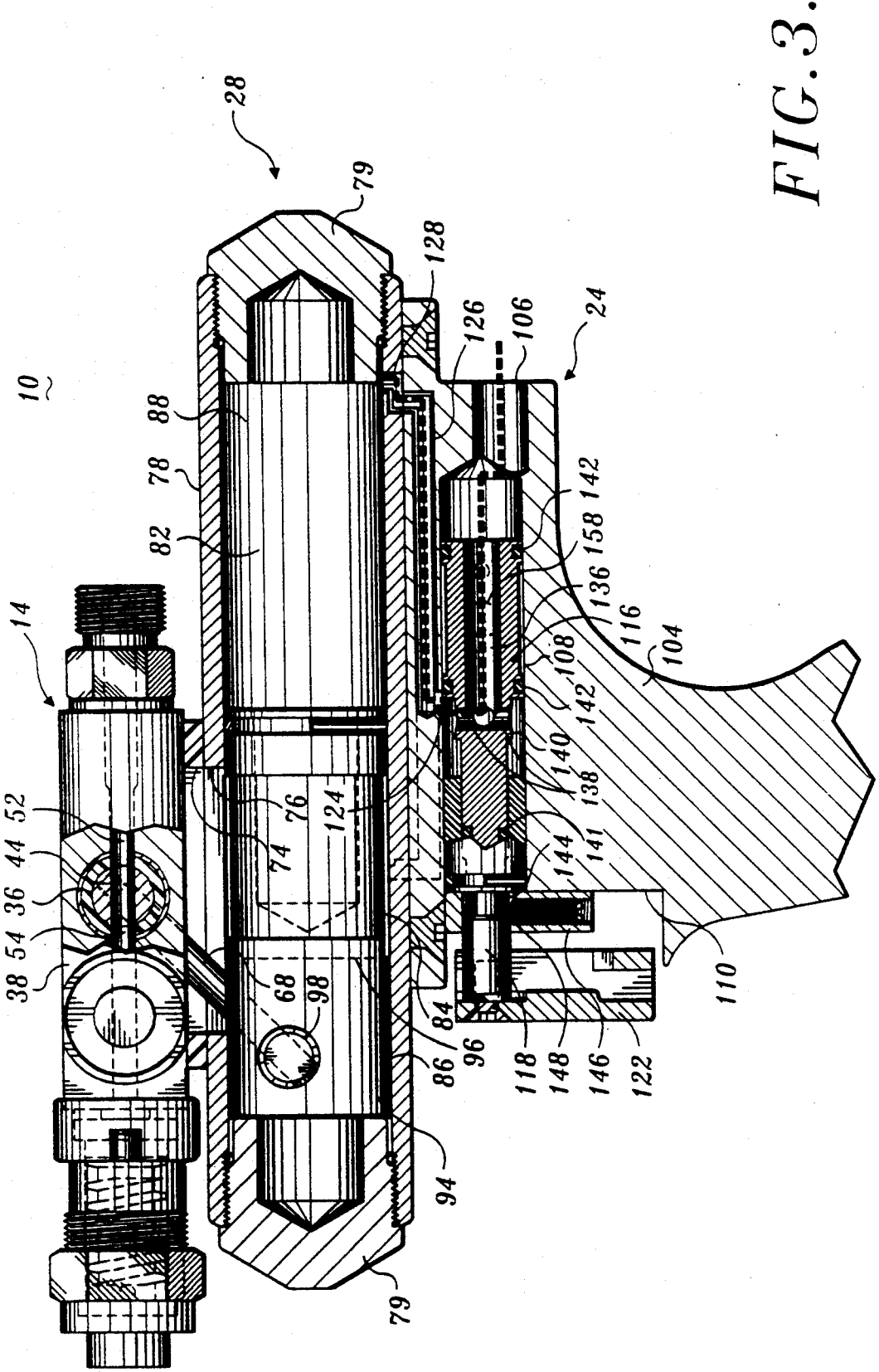
FIG. 3 provides a side elevation partial cross-sectional view of the spray gun of FIG. 1 configured in the on position to permit flow of the first and second fluid streams.

Reference is now had to FIGS. 2 and 3 to illustrate how sliding of the slide piston 84 results in rotation of the valve rotor 36. FIG. 2 shows the valve rotor 36 in the off position, in which the slide piston 84 is disposed within the rearward slide chamber portion 88 of the slide chamber 82. To rotate the valve rotor 36 through the intermediate position and to the on position, the slide piston 84 is caused to slide forwardly within the slide chamber 82 towards the forward slide chamber portion 86. As the slide piston 84 slides within the slide chamber 82, the linkage member 68 causes the valve rotor 36 to rotate about its rotational axis 37 and the pin 98 in the slide piston 84 to rotate correspondingly. As the slide piston 84 slides, the lower end 80 of the linkage member 68 slides downwardly through the hole 100 within the pin 98. FIG. 3 illustrates the slide piston 84 slide forward all the way into the forward slide chamber portion 86, at which point the valve rotor 36 has rotated fully past the intermediate position to the on position. In this position the resin and catalyst valve passages 44 and 46 are aligned with the corresponding fluid supply and discharge passages to open both the resin and catalyst valves 18 and 20. During the slidable movement of the slide piston 84 through the intermediate position, the resin valve passage 44 is partially aligned prior to alignment of the catalyst valve passage 46 to open the resin valve 18 momentarily before the catalyst valve 20.

Further reference is had to FIGS. 2 and 3 to describe the actuation of the slidable movement of the slide piston 84 by operation of the trigger assembly 24. The slide assembly 28 is detachably mounted by screws 102 or other conventional fasteners to a trigger housing 104 of the trigger assembly 24. The trigger housing 104 defines a hand grip for grasping by a user of the spray gun. As shown in FIG. 1, the pneumatic fitting 26 is mounted in the rearward end of the trigger housing 104. Referring to FIG. 2, a pneumatic supply such as an air compressor can be connected to the fitting 26 to communicate with an air inlet passage 106 within the trigger housing 104.

The air inlet passage 106 opens into an actuating chamber 108 formed in the trigger housing 104 and extending forwardly to open into a forward face 110 of the trigger housing 104. A bushing 112 is mounted within the forward end of the actuating chamber 108 and receives an actuating piston 114 having a rearward end 116 extending in to the actuating chamber 108 and a forward end 118 projecting outwardly from the actuating chamber 108. A conventional O-ring 120 or other seal is disposed between the bushing 112 and the terminus of the actuating chamber 108.

A trigger member 122 is secured to the forward end 118 of the actuating piston 114 and is gripped by a user's finger to slide the actuating piston 114 into the actuating chamber 108 to control communication of the pneumatic air supply with the slide chamber 82. Referring to FIG. 3, the actuating chamber 108 includes a forward port 124 opening into a first passage 126 formed within the trigger housing 104. The first passage 126 is aligned at its opposite end with a corresponding passage 128 formed in the slide barrel 78 and opening into the rearward slide chamber portion 88. Referring to FIG. 2, the actuation chamber 108 further includes a rearward port 130 opening into the first end of a second passage 132 formed in the trigger housing 104. The opposite end of the second passage 132 opens into a passage 134 formed in the side barrel 78 that opens into the forward slide chamber portion 86 of the slide chamber 82. The first and second passages 126 and 132 are disposed in spaced, nominally parallel relationship to each other. For clarity, only the second passage 132 is shown in FIG. 2, with the first passage 126 shown in dashed lines, and vice versa for FIG. 3.

Referring again to FIG. 2, the rearward end 116 of the slide piston 114 includes a central bore that extends forwardly from the piston's rearmost extremity, terminating in opposing radial branch passages 138. Branch passages 138 open into a reduced diameter central portion 140 of the actuating piston 114. An O-ring 141 installed within a groove (not shown) on the actuating piston 114 between the central portion 140 and the forward end 118, provides for an airtight seal between the actuating piston 114 and the surrounding bushing 112. Two O-rings 142 are included on the rearward end 116 of the actuating piston 114 to seal with the actuating chamber 108, with one O-ring 142 disposed in a groove adjacent the rearmost extremity of the actuating piston 114 and one O-ring 142 disposed in a groove adjacent the central portion 140 of the actuating piston.

Referring still to FIG. 2, the actuating piston 114 further includes a neck portion 144, having a diameter reduced further from that of the central portion 140, formed between the central portion 140 and the forward end 118. In FIG. 2, the actuating piston 114 is disposed forwardly within the actuating chamber 108, with the central portion 140 of the piston abutting the bushing 112. Pressure from the pneumatic supply via the air inlet passage 106 biases the actuating piston towards this forward position, which shall be referred to as the off position. Once so configured, the rearward end 116 of the actuating piston 114 is forward of the rearward port 130, allowing pneumatic communication between the air supply, the actuating chamber 108, the rearward port 130, the second passage 132 and the forward slide chamber portion 86. Thus, the pressure of the pneumatic supply when the actuating piston is in the off position forces the slide piston 84 towards the rearward slide chamber portion 88 of the slide chamber 82, resulting in the valve rotor 36 being maintained in the off position. In the off position, both the resin and catalyst valves 18 and 20 are closed.

Referring to FIG. 3, to use the spray gun a user squeezes the trigger 122 to move the actuating piston rearwardly within the actuating chamber 108 to an on position. A detent block 146 is secured to the forward face 110 of the trigger housing 104. A spring loaded detent ball 148 projects upwardly from the detent block 146 and bears against the neck portion 144 of the actuating piston 114. When the trigger 122 is moved to the on position, the detent ball contacts the shoulder formed between the neck portion 144 and the forward end 118 of the actuating piston 114, enabling the user to maintain the trigger 122 and actuating piston 114 reliably in the on position. In this on position, the rearward port 130 of the actuating chamber 108 is taken out of pneumatic communication with the air supply by the rearward end 116 of the actuating piston 114. However, the central portion 140 of the actuating piston 114 is disposed adjacent the forward port 124. This enables the air to flow from the pneumatic supply into the actuating chamber 108, through the central passage 136, out the radial branch passages 138 into the forward port 124, and into the first passage 126 to the rearward slide chamber portion 88. Thus in the on position, the pneumatic supply is placed in fluid communication with the rearward slide chamber portion 88 to force the slide piston 84 to slide forwardly within the slide chamber 82 towards the forward slide chamber portion 86. Air from within the forward slide chamber portion 86 exhausts past the forward end 94 of the piston 84 through the actuating chamber 108. As the slide piston 84 slides forwardly within the slide chamber 82, the valve rotor 36 is rotated through the intermediate position, to partially open the resin valve 18, and then to the on position to open both the resin and the catalyst valves 18 and 20.

For some applications, only resin and catalyst are discharged by the spray gun, such as for application of gelcoats or resin coatings. For other applications, it is desirable to add a stream of chopped glass fibers to the discharged resin mixture stream to form fiber-reinforced resin structures. Referring to FIG. 1, the spray gun may accordingly include a glass chopper 150 that receives strands of glass fiber, chops them into shorter lengths and sprays them out of a discharge conduit 152 where they merge with the stream of resin mixture being discharged out of the nozzle 34 of the gun. One conventional glass chopper is available from Venus-Gusmer, A Division of PMC, Inc. of Kent, Wash. The glass chopper may be operated by pneumatic pressure, and the spray gun constructed in accordance with the present invention may include means to control the communication of the pneumatic supply with the glass chopper. Thus, referring to FIG. 1, the trigger housing 104 includes a pneumatic output fitting 154 that is connected by a hose 156 to the glass chopper 150.

To this end the actuating chamber 108 includes a pneumatic outlet port 158, shown in dashed lines in FIGS. 2 and 3. The pneumatic outlet port 158 communicates with the pneumatic output fitting 154 to place the pneumatic air supply in fluid communication with glass chopper 150.

Figure 4:
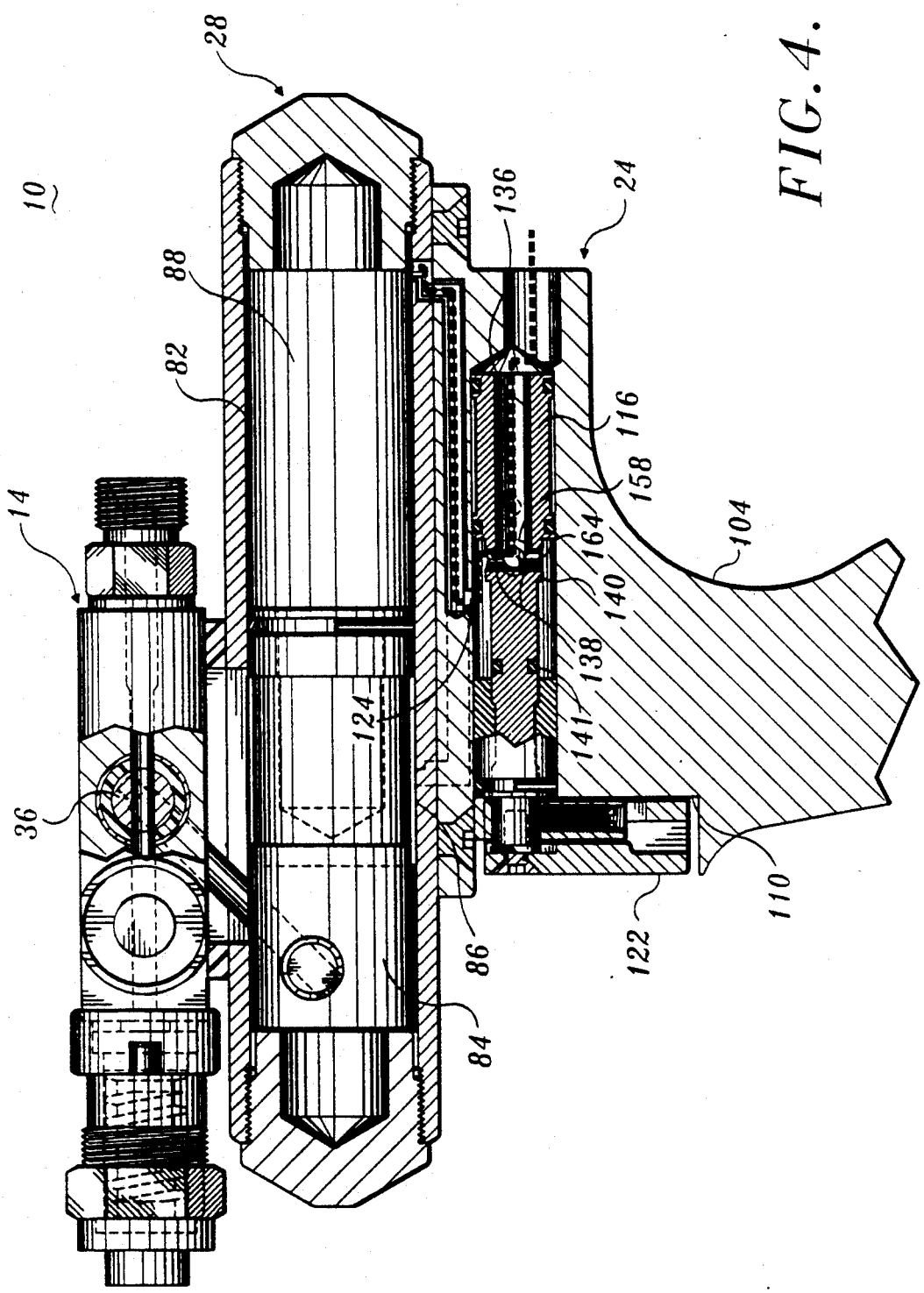
FIG. 4 shows a side elevation partial cross-sectional view of the spray gun of FIG. 1 with the trigger in the full-stop position to enable pneumatic communication with the glass-strand chopper.

Referring to FIG. 4, the user of the handgun may further squeeze the trigger 122 to overcome the force on the spring loaded detent ball 148 to allow further insertion of the actuating piston 114 into the actuating chamber 108. The piston 114 may be fully inserted to a full-stop position in which the trigger 122 contacts the forward face 110 of the trigger housing 104. Also note briefly with regard to FIG. 1 that a catch button 160 may be included on the forward face 110 of the trigger housing to engage with a hook 162 formed on the inside of the trigger 122 to retain the trigger in the full-stop position until the user chooses to disengage it from the catch button by rotating the trigger slightly.

Referring again to FIG. 4, when the trigger 122 is in the full-stop position the rearward end 116 of the actuating piston 114 is inserted fully into the actuating chamber 108, and continues to block the rearward port 130 while enabling fluid communication with the forward port 124. Thus, the slide piston 84 remains forwardly disposed within the slide chamber 82 and the valve rotor 36 remains in the on position for flow of both catalyst and resin. In this full-stop position of the trigger, a third radial branch passage 164, disposed in pneumatic communication with the central passage 136 within the rearward end 116 of the actuating piston, is aligned with the pneumatic outlet port 158. This places the pneumatic air supply in pneumatic communication with the glass chopper 150 to start the flow of chopped glass fibers for mixing with the discharged resin mixture stream.

Figure 5B:
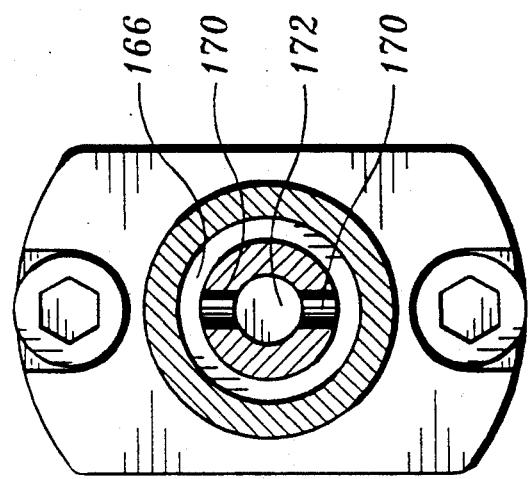
FIG. 5B shows a cross-sectional view of the discharge flow passages of the turbulent mixer, taken substantially along the line 5B—5B of FIG. 5.

Reference is now had to FIG. 5 to further describe the construction of the valve and mixing assembly 14. The spray gun 10 includes a mixer 22 for mixing the resin and catalyst streams discharged by the resin and catalyst discharge passages 54 and 62, respectively. The mixer 22 is detachably connected to the valve block 38 by screws 165 (FIG. 1) or other conventional fasteners. The mixer illustrated in FIG. 5 is a turbulent mixer available from Venus-Gusmer, A Division of PMC, Inc. Kent, Wash. The mixer includes a cylindrical core 166 including a helical flange 168 formed about its outer diameter. Notches are cut in a reverse helical formation across the flange 168, and the fluid stream flows around the flange 168 and through the notches to be mixed. FIG. 5B presents a cross section of discharge passages 170 formed in the forward end of the mixer core 166. The discharge passages 170 are formed diametrically opposite each other and inwardly towards the center of the core 166, joining to form an enlarged central passage 172 through which the resin mixture is discharged. The spray gun may further include a conventional nozzle (not shown) installed forwardly of the mixer.

Figure 13:
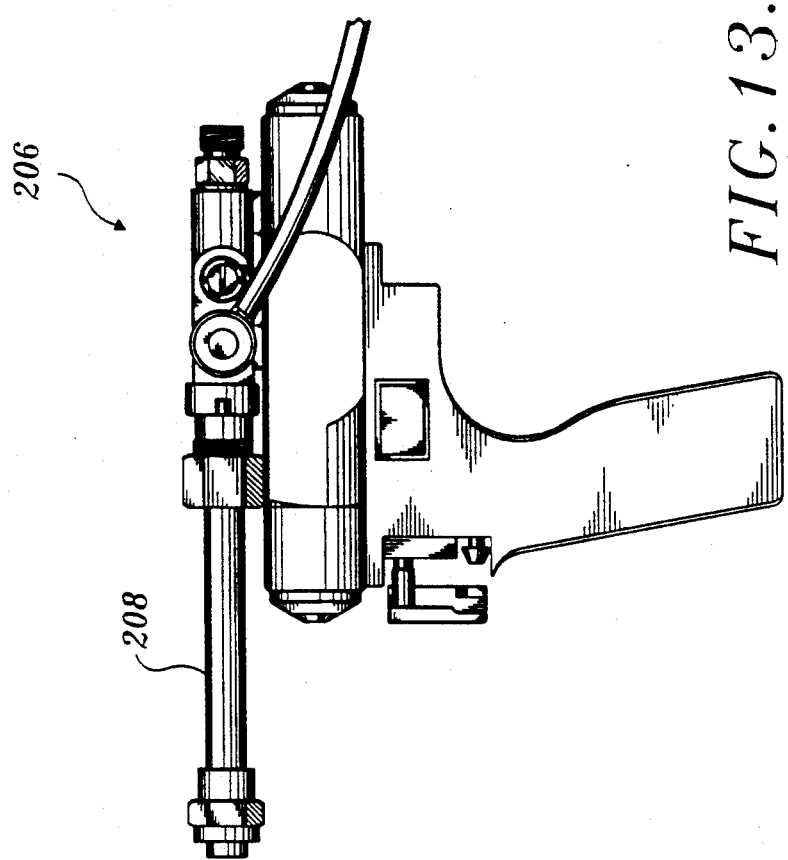
FIG. 13 provides a side elevation view of an alternate embodiment of a spray gun constructed in accordance with the present invention, utilizing a longer mixer and no glass chopper so as to provide a mixture of the first and second fluid alone.

Other conventional mixers may also be utilized in accordance with the present invention. One such example would be a static mixer, such as a Chem-Mixx static mixer is commercially available from the Chem-Mixx Corporation, Medford, Mass. Additionally, a longer "extended" mixer 208 of either the static or turbulent type may be utilized, as shown in FIG. 13.

Referring again to FIG. 5, the spray gun 10 further includes a distribution plate 174 to distribute the catalyst stream within the resin stream prior to entry into the mixer 22. The distribution plate 174 is disposed within a cavity 176 formed in the mixer housing 178 adjacent the forward face of the valve block 38. Sandwiched between the distribution plate 174 and the valve block 38 is the annular flange 180 of a catalyst injector 182 and two seals 184. The outside diameter of the annular flange 180 of the injector 182 is smaller than the inside diameter of the cavity 176 in the mixer housing. Thus when the resin valve 18 is open, resin flows from the resin discharge passage 54 of the valve block 38 and into a reservoir 185 formed by the cavity 176 on the rear side of the distribution plate 174.

Figure 5A:
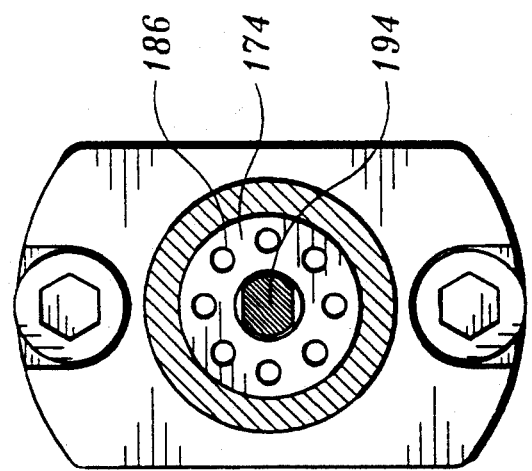
FIG. 5A shows a cross-sectional view of the distribution plate, taken substantially along the line 5A—5A of FIG. 5.

The distribution plate 174 includes a plurality of secondary passages 186 formed through the distribution plate to place the reservoir 185 in fluid communication with a distribution chamber 188 formed between the distribution plate 174 and the mixer core 166. Details of this construction can also be seen in FIG. 10. Each secondary passage 186 is outwardly tapered at its rearward end and has a longitudinal axis parallel to the central longitudinal axis of the distribution plate 174, which is preferably cylindrical, and the mixer core 166. As shown in the cross-sectional view of FIG. 5A, the secondary passages 186 are disposed circumferentially in spaced-apart relationship to each other about the central axis of the distribution plate 174.

Referring again to FIG. 10, resin flows from the discharge passage 54 of the valve block 38, into reservoir 185, and then through the various secondary passages 186 into the distribution chamber 188.

The distribution plate 174 further includes an axial central opening 190 into which the hollow, cylindrical body of the injector 182 is inserted, with the flange 180 of the injector abutting the rearward face of the distribution plate 174. The injector 182 projects forwardly beyond the distribution plate 174 into the distribution chamber 188. An inner passage 191 is formed through the injector 182 and terminates at the forward end in an outwardly tapering inner surface 192. The injector further includes a plunger 194 having a shaft of cross section smaller than the cross section of the inner passage 191 of the injector 182. The plunger 194 is disposed within the inner passage 191 and terminates in a plunger head that is tapered to correspond to the tapered inner surface 192 of the injector. A compression spring 198 on the plunger 194 normally biases the plunger rearwardly so that the plunger head 196 contacts the tapered inner surface 192 of the injector to prevent flow through the injector.

Referring again to FIG. 5, the catalyst stream flows through the open catalyst valve 20 and into the catalyst discharge passage 62. A spring loaded ball check valve 200, such as one available from Gusmer, a division of PMC Inc., Lakewood, N.J., is included within the discharge passage 62 downstream of the valve rotor 36. The check valve 200 is a redundant, and thus optional, part of the spray gun since the catalyst injector 182 provides a check valve function. The catalyst injector 182 is located further downstream of the spring loaded ball check valve 200 within the terminus of the discharge passage 62. Referring again to FIG. 10, when the catalyst valve 20 is open the pressure of the catalyst stream is sufficiently great to open both the spring loaded ball check valve 200 and the catalyst injector 182. When thus opened, catalyst flows between the plunger 194 and the inner passage 191 of the injector 182 and is discharged between the tapered inner surface 192 and the plunger head 196.

This discharge creates an annular stream of catalyst that merges with an annular stream of resin, formed by convergence of the resin flowing through the secondary passages 186, within the distribution chamber 188 to distribute the catalyst within the resin. The collection of resin within the reservoir 185 prior to flowing through the distribution plate 174, ensures for overflow of the resin through all of the secondary passages 186. The resin and catalyst thus flow from the distribution plate 174 and the injector 182, respectively, in symmetrical concentric streams. The distributed catalyst and resin then flow into the mixer for further mixing.

Opening of the catalyst valve 20 after the resin valve 18 allows the resin to flow into the distribution chamber 188 upon initial operation of the gun prior to the flow of any catalyst out of the catalyst injector 182. Thus, when the catalyst valve is subsequently open with further rotation of the valve rotor 36, the catalyst does not flow too rapidly into the distribution chamber 188, instead being distributed into the resin already present there. This prevents loss of catalyst line pressure and results in a proper catalyst-to-resin ratio.

Reference is now had to FIG. 11 to illustrate flushing of the spray gun after operation. To shut off the spray gun, the trigger 122 is released. The pneumatic pressure in the actuating chamber 108 causes the actuating piston 114 to move forwardly to the off position, placing the pneumatic air supply in fluid communication with the forward slide chamber portion 86, as shown in FIG. 2. This in turn causes the slide piston 84 to slide rearwardly within the slide chamber 82 to rotate the valve rotor 36 counterclockwise, thus closing both the resin valve 18 and the catalyst valve 20.

Referring again to FIG. 11, when thusly closed the catalyst stream pressure is insufficient to keep the check valve 200 and injector 182 open. Thus the plunger 194 moves rearwardly within the inner passage 191 of the injector 182 under the pressure of the compression spring 198 to close the injector. To flush the gun of remaining resin and resin mixture to prevent clogging of the gun with cured resin, a flush plunger 202 is included in the spray gun 10. The flush plunger 202 is mounted within a flush fitting 204 that is secured to the valve block 38. A solvent inlet line 206 is connected by a threaded connector 205 to the flush fitting 204 to feed solvent to the flush plunger valve 202. The flush plunger valve 202 is spring loaded to normally remain in the closed position, but may be depressed manually to unseat the plunger to allow flow of solvent into the resin discharge passage 54. In this manner, the solvent flushes the resin discharge passage 54, the distribution plate 174 and the mixer 22 of remaining resin and resin mixture.

The above-described spray gun 10 embodies a further aspect of the present invention by virtue of its modularized construction. The mixer 22, valve block 38, slide assembly 28, and trigger assembly 24 may be constructed as individual modules that are detachably connected by screws 165, 69, and 102 to assemble the spray gun 10. This modularized construction enables broken or worn components of the gun, such as the mixer 22, to be removed and replaced at fairly low cost. The modularized construction of the preferred embodiment of a spray gun 10 also enables the gun to be reconfigured to handle different resin systems, mix ratios and flow rates.

The spray gun 10 described above provides one illustration of the routing of air passages within a spray gun constructed in accordance with the present invention, but other configurations are possible. For instance, it may be preferable to route the first and second passages 126 and 132 connecting the slide chamber portion 86 and actuating chamber 108 differently to reduce manufacturing cost of the spray gun. In one such alternate configuration, a first passage would be formed straight upwardly from a rearward port included in the actuating chamber into a rearward portion of the slide chamber. A second passage would be formed to extend from a forward port included in the actuating chamber to a forward portion of the slide chamber. To accomplish this routing of the passages, the slide assembly would be mounted to the trigger assembly 180° opposite of that described for spray gun 10 above. The direction of movement of the slide piston within the slide chamber as the gun is moved between the off and on positions would then be reversed. Likewise, the valve rotor and linkage member would be oriented as the mirror image of that in the above-described spray gun 10 embodiment to rotate in the opposite direction as that of spray gun 10. Other alternate arrangements of the first and second passages are likewise possible.

In view of the disclosure above it should be apparent that various additional alterations may be made to the above-described embodiment in accordance with the present invention. The preferred embodiment of spray gun 10 has been described as including a valve rotor 36 having parallel resin and catalyst valve passages 44 and 46 with differing cross-sectional areas for staggered valve opening. It should be apparent that the valve passages may be sized and disposed differently and still function in accordance with the present invention for staggered valve opening. For instance, the resin and catalyst valve passages could be formed with equal cross-sectional areas, but with the axis of the catalyst valve passage skewed with respect to the axis of the resin valve passage. The valve passage axes would be oriented such that the resin valve passage comes into partial alignment to start flow first while the catalyst valve passage remains nonaligned. When the resin valve passage is fully aligned, the catalyst valve passage would still be only partially aligned, corresponding to the lesser flow rate of catalyst.

Likewise, for resin systems having equal flow rates of first and second fluids, such as some epoxy resin and hardener systems, the first and second valve passages would preferably be disposed in parallel relationship and have equal cross-sectional areas in a spray gun constructed in accordance with the broadest aspects of the present invention. The valves would then open concurrently, rather than in staggered fashion. The rigid mechanical connection of the valves by a valve rotor would ensure concurrent valve opening without requiring periodic adjustment.

All of the above-described spray gun embodiments could alternately be constructed in accordance with the present invention with a different type of rigid mechanical interconnection of the first and second valves from the rotor 36 of the spray gun 10. For example, one variation would be the utilization of first and second ball valves that are rigidly interconnected by a plate. A mechanism would be included to rotate the plate and ball valves to achieve the desired staggered or concurrent opening of the first and second ball valves.

FIG. 13 presents an alternate embodiment of a spray gun 206 constructed in accordance with the present invention. The spray gun 206 is the same as spray gun 10, with the exception that there is no glass chopper 150 and the mixer 22 has been replaced with an extended mixer 208. As discussed previously, this mixer may be of either the static or turbulent type, as well as other types of mixers. The configuration of a spray gun 206 may be desired for the application of gelcoat or a resin coating, as no glass fibers are added and even more improved mixing of the resin and hardener is desirable.

One of ordinary skill, after reading the foregoing specification, will be able to effect various other changes, alterations and substitutions of equivalents without departing from the broad concepts disclosed. It is therefore intended that the scope of Letters Patent grated hereon be limited only by the definition contained in the appended claims and the equivalents thereof.

The embodiments of the invention in which an exclusive property or privilege is claimed are defined as follows:

1. A spray gun for mixing a first fluid stream with a second fluid stream and discharging a mixed fluid stream comprising:
    a hand-held housing;
    a first valve disposed within the housing for controlling the flow of the first fluid stream through the housing, including a first valve passage having an inlet port and an outlet port that are positionable for fluid communication with a first fluid supply passage in the housing and a first fluid discharge passage in the housing, respectively, to open the first valve;
    a second valve disposed within the housing for controlling the flow of the second fluid stream through the housing, including a second valve passage having an inlet port and an outlet port that are positionable for fluid communication with a second fluid supply passage in the housing and a second fluid discharge passage in the housing, respectively, to open the second valve;
    means rigidly interconnecting the first and second valves for opening the first valve to start flow of the first fluid stream and for delayed opening of the second valve to start flow of the second fluid stream after flow of the first fluid stream has started, wherein the means for opening the first and second valves positions the first valve passage in fluid communication with the first fluid supply and discharge passages, followed by positioning of the second valve passage in fluid communication with the second fluid supply and discarged passages while the first valve passage remains in fluid communication with the first fluid supply and discharge passages; and
    means disposed within the housing for mixing the first fluid stream and the second fluid stream to discharge a mixed fluid stream.

2. The spray gun of claim 1, wherein the means for opening the first and second valves includes first means for coupling the first valve and the second valve to change the positions of the first and second valve passages concurrently while still delaying the opening of the second valve until after the first valve is opened.

3. The spray gun of claim 2, wherein the first means comprises a valve rotor connecting the first valve to the second valve and rotatable within the housing about a valve axis between an off position in which the first and second valves are both closed to prevent flow of the first and second fluid streams, respectively, and an on position in which the first and second valves are both open to permit flow of the first and second fluid streams, respectively, the first valve opening at least partially while the second valve is still closed as the valve rotor is rotated from the off position to the on position.

4. The spray gun of claim 3, wherein the valve rotor comprises a cylindrical valve rod and the first and second valve passages define first and second valve axes, respectively, formed diametrically through the valve rod.

5. The spray gun of claim 4, wherein:
    the cross-sectional area of the first valve passage is larger than the cross-sectional area of the second valve passage;
    the first valve axis is parallel to the second valve axis; and
    the inlet and outlet ports of the first valve passage come into partial alignment with the first fluid supply and discharge passages, respectively, as the valve rod is rotated from the off position towards the on position, before the inlet and outlet port of the second valve passage come into partial alignment with the second fluid supply and discharge passages, respectively.

6. A spray gun for mixing a first fluid stream with a second fluid stream and discharging a mixed fluid stream, comprising:
    a hand-held housing;
    a first valve disposed within the housing for controlling the flow of the first fluid stream through the housing;
    a second valve disposed within the housing for controlling the flow of the second fluid stream through the housing;
    means disposed within the housing for mixing the first fluid stream and the second fluid stream to discharge a mixed fluid stream; and
    means regidly interconnecting the first and second valves for opening the first valve to start flow of the first fluid stream and for delayed opening of the second valve to start flow of the second fluid stream after flow of the first stream has started, wherein the means for opening the first and second valves comprise:
    rotor means for connecting the first valve and the second valve; and means connected to the rotor means for rotating the rotor means to open the first and second valves, the first valve opening before the second value.

7. A spray gun for mixing a first fluid stream with a second fluid stream and discharging a mixed fluid stream, comprising:
a hand-held housing;
a first valve disposed within the housing for controlling the flow of the first fluid stream through the housing;
a second valve disposed within the housing for controlling the flow of the second fluid stream through the housing;
means rigidly interconnecting the first and second valves for opening the first valve to start flow of the first fluid stream and for delayed opening of the second valve to start flow of the second fluid steam after flow of the first fluid stream has started;
means disposed within the housing for mixing the first fluid stream and the second fluid stream to discharge a mixed fluid stream; and
actuating means coupled to the means for opening the first and second valves for actuating the means for opening the first and second valves, the actuating means being reversibly movable from an off position, in which the means for opening the first and second valves causes both the first valve and the second valve to be closed to prevent flow of the first and second fluid streams, respectivley, through an intermediate position, in which the means for opening the first and second valves causes the first valve to be open at least partially to permit flow of the first fluid stream and the second valve remains closed, to an on position in which the means for opening the first and second valves causes both the first valve and second valve to be open to permit flow of the first and second fluid streams, respectively.

8. The spary gun of claim 7 wherein the actuating means comprises:
a pneumatic trigger member mounted in the housing for reversible movement from the off position, through the intermediate position, to the on position, movement of the trigger controlling the pneumatic communication of a pneumatic supply with the means for opening the first and second valves to actuate the means for opening the first and second valves.

9. The spray gun of claim 8, wherein the pneumatic trigger member is reversibly movable from the off position, sequentially through the intermediate position and the on position, to a full-stop position, further comprising:
a glass-strand chopper mounted to the housing for discharging chopped glass fibers to merge with the mixed fluid stream; and
detent means contacting the pneumatic trigger to enable maintaining the pneumatic trigger in the on position, the detent means being capable of being overcome by exerting force on the pneumatic trigger to move the pneumatic trigger to the full-stop position, wherein the glass-strand chopper is activated to discharge chopped glass fibers.

10. The spray gun of claim 7, wherein the means for opening the first and second valves comprises:
means for rigidly interconnecting the first valve and the second valve; and
means for coupling the means for rigidly interconnecting the first valve and the second valve to the actuating means; and wherein:
the first valve, the second valve, and the means for rigidly interconnecting the first valve and the second valve are disposed within a valve block; and
the means for mixing, the valve block, the means for coupling, and the actuating means for detachably assembled together to allow replacement of worn spray gun components and reconfiguration of the spray gun.

11. The spray gun of clima 7, wherein the means for opening the first and second valves comprises:
rotor means disposed within the housing for connecting the first valve and the second valve and reversibly rotatable from an off position, through an intermediate postion, to an on position corresponding to the off, intermediate and on positions of the actuating means, respectively; and
coupling means for coupling the rotor means to the actuating means so that movement of he actuating means results in rotation of the rotor means.

12. The spray gun of claim 11, wherein the coupling means comprises:
a pneumatic slide chamber formed within the housing and having a first slide chamber portion and a second slide chamber portion;
a slide piston slidably mounted within the pneumatic slide chamber and separating the first and second slide chamber portions; and
linkage means linking the slide piston to the rotor means, and wherein:
movement of the actuating means controls the pneumatic communication of a pneumatic supply with the pneumatic slide chamber, the actuating means alternately placing the pneumatic supply in pneumatic communication with the first slide chamber portion when the actuating means is in the off position, forcing the slide piston toward the second slide chamber portion and maintaining the rotor means in the off position, and placing the pneumatic supply in pneumatic communication with the second slide chamber portion when the actuating means is in the on position, forcing the slide piston toward the first slide chamber portion and rotating the rotor means through the intermediate position and to the on position.

13. The spray gun of claim 12, wherein the linkage means comprises an elongate link member having a first end secured radially to the rotor means and a second end mounted to slide through a slot formed transversely through the slide piston so sliding of the piston results in rotation of the rotor member.

14. The spray gun of claim 13, wherein:
the first valve includes a first valve passage formed diametrically through the rotor means to define a first valve axis and having an inlet port and and outlet port that are positionable for fluid communication with a first fluid supply passage in the housing and a first fluid discharge passage in the housing, respectively; and
the second valve includes a second valve passage formed diametrically through the rotor means to define a second valve axis and having an inlet port and an outlet port that are positionable for fluid communication with a second fluid supply passage in the housing and a second fluid discharge passage in the housing, respectively.

15. The spray gun of claim 14 wherein:
   the cross-sectional area of the first valve passage is larger than the cross-sectional area of the second valve passage;
   the first valve axis is parallel to the second valve axis; and
   the inlet and outlet ports of the first valve passage come into partial alignment with the first fluid supply and discharge passages, respectively, before the inlet and outlet port of the second valve passage come into partial alignment with the second fluid supply and discharge passages, respectively, as the rotor means is rotated from the off position towards the on position.

16. The spray gun of claim 16, wherein the actuating means comprises:
   a pneumatic actuating chamber formed within the housing in fluid communication iwth the pneumatic supply and defining a first actuating port disposed in pneumatic communication with the first slide chamber portion and a second actuating port disposed in pneumatic communication with the second slide chamber portion; and
   an actuating piston having a first end slidably disposed within the actuating chamber and a second end projecting axially from the actuating chamber, the actuating piston being reversibly slidable between an off position, in which the first end of the actuating piston obstructs the second actuating port and permits pneumatic communication between the pneumatic supply and the first actuating port, and an on position, in which the first end of the actuating piston obstructs the first actuating port and permits pneumatic communication of the pneumatic supply with the second actuating port.

17. The spray gun of claim 16, wherein the actuating piston is reversibly slidable from the off position, through the on position, to a full-stop position, further comprising:
   a glass-strand chopper mounted to the housing for discharging chopped glass fibers to merge with the mixed fluid stream; and
   detent means contacting the actuating piston to enable maintaining the actuating piston in the on position, the detent means being capable of being overcome by exerting force on the actuating piston to move the actuating piston to the full-stop position, wherein the glass-strand chopper is activated to discharge chopped glass fibers.

18. A spray gun for mixing a first fluid stream with a second fluid stream and discharging a mixed fluid stream, comprising:
   a hand-held housing;
   a first valve disposed within the housing for controlling the flow of the first fluid stream through the housing;
   a second valve disposed within the housing for controlling the flow of the second fluid stream through the housing;
   means rigidly interconnecting the first and second valves for opening the first valve to start flow of the first fluid stream and for delayed opening of the second valve to start flow of the second fluid stream after flow of the first fluid stream has started;
   means disposed within the housing for mixing the first fluid stream and the second fluid stream to discharge a mixed fluid stream; and
   a distributor disposed within the housing, the first and second fluid streams flowable from the first and second valves through the distributor for distributing the second fluid stream within the first fluid stream and then flowing into the means for mixing the first and second fluid streams.

19. The spray gun of claim 18, wherein the distributor comprises a distribution plate including means for defining a central passage opening therethrough the second fluid stream flowable through the central passage for discharge into a distribution chamber formed within the housing between the distribution plate and the means for mixing the first and second fluid streams, and having a plurality of secondary passages formed therethrough and disposed circumferentially in spaced-apart relationship around the central passage, the first fluid stream being flowable through the secondary passages for discharge into the distribution chamber wherein the second fluid is distributed within the first fluid stream.

20. The spray gun of claim 19, wherein the second fluid stream and first fluid stream are discharged from the distribution plate to form concentric, symmetrical streams that merge within the distribution chamber.

21. The spray gun of claim 20, wherein the second fluid stream forms a generally annular stream when discharged from the central passage of the distribution plate.

22. The spray gun of claim 21, wherein the central passage of the distribution plate defines an injector surface that tapers outwardly towards the distribution chamber, further comprising:
   an injector plunger disposed within the central passage and defining a tapered plunger surface that conforms to the injector surface, the injector plunger being axially movable within the central passage between an open position in which flow of the second fluid stream is permitted between the injector surface and the plunger surface, and a closed position in which the plunger valve surface interacts with the injector surface to prevent flow of the second fluid stream through the central passage.

23. The spray gun of claim 22, further comprising biasing means for biasing the injector plunger to the closed position.

24. An internal mix spray gun for mixing a first viscous liquid stream with a second viscous liquid stream and discharging a mixed liquid stream, comprising:
   a hand-held housing;
   a first valve disposed within the housing for controlling the flow of the first viscous liquid stream through the housing;
   a second valve disposed within the housing for controlling the flow of the second viscous liquid stream through the housing;
   means disposed within the housing for mixing the first viscous liquid stream and the second viscous liquid stream to discharge a mixed liquid stream;
   a distributor disposed within the housing, the first and second viscous liquid streams being flowable from the first and second valves, respectively, through the distributor as concentric streams for distributing the second viscous liquid stream within the first viscous liquid stream and then into the means for mixing the first and second viscous liquid streams.

25. The spray gun of claim 24, wherein the distributor comprises a distribution plate including means for defining a central passage opening therethrough, the second fluid stream flowable through the central passage for discharge into a distribution chamber formed within the housing between the distribution plate and the means for mixing the first and second fluid streams, and having a plurality of secondary passages formed therethrough and disposed circumferentially in spaced-apart relationship around the central passage, the first fluid stream being flowable through the secondary passages for discharge into the distribution chamber wherein the second fluid is distributed within the first fluid stream.

26. The spray gun of claim 25, wherein the second fluid stream and first fluid stream are discharged from the distribution plate to form concentric, symmetrical streams that merge within the distribution chamber.

27. A spray gun for mixing a first fluid stream with a second fluid stream and discharging a mixed fluid stream, comprising:
   a hand-held housing;
   a first valve disposed within the housing for controlling the flow of the first fluid stream through the housing;
   a second valve disposed within the housing for controlling the flow of the second fluid stream through the housing;
   means disposed within the housing for mixing the first fluid stream and the second fluid stream to discharge a mixed fluid stream; and
   a distributor disposed within the housing, the first and second fluid streams being flowable from the first and second valves, respectively, through the distributor for distributing the second fluid stream within the first fluid stream and then into the means for mixing the first and second fluid streams.
   wherein the distributor comprises a distribution plate including means for defining a central passage opening therethrough, the second fluid stream flowable through the central passage for discharge into a distribution chamber formed within the housing between the distribution plate and the means for mixing the first and second fluid streams, and having a plurality of secondary passages formed therethrough and disposed circumferentially in spaced-apart relationship around the central passage, the first fluid stream being flowable through the secondary passages for discharge into the distribution chamber, wherein the second fluid stream forms a generally annular stream when discharged from the central passage of the distribution plate, and the second fluid stream and first fluid stream are discharged from the distribution plate to form concentric, symmetrical streams that merge within the distribution chamber to distribute the second fluid within the first fluid stream.

28. The spray gun of claim 27, wherein the central passage of the distribution plate defines an injector surface that tapers outwardly towards the distribution chamber, further comprising:
   an injector valve plunger disposed within the central passage and defining a tapered plunger surface that conforms to the injector surface, the injector plunger being axially movable within the central passage between an open position in which flow of the second fluid stream is permitted between the injector surface and the plunger surface, and a closed position in which the plunger valve surface interacts with the injector surface to prevent flow of the second fluid stream through the central passage.

29. A spray gun for mixing a first fluid stream with a second fluid stream and discharging a mixed fluid stream, comprising:
   a hand-held housing;
   a first valve disposed within the housing for controlling the flow of the first fluid stream through the housing;
   a second valve disposed within the housing for controlling the flow of the second fluid stream through the housing;
   rotor means for rigidly interconnecting the first and second valves, rotation of the rotor means resulting in opening the first and second valves to start flow of the first and second fluid streams; and
   means disposed within the housing for mixing the first fluid stream and the second fluid stream to discharge a mixed fluid stream.

30. The spray gun of claim 29, further comprising:
   actuating means coupled to the rotor means, the actuating means being reversibly movable from an off position, in which the rotor means causes both the first valve and the second valve to be closed to prevent flow of the first and second fluid streams, respectively, to an on position in which the rotor means causes both the first valve and second valve to be open to permit flow of the first and second fluid streams, respectively.

31. The spray gun of claim 30, wherein the actuating means comprises:
   a pneumatic trigger member mounted in the housing for reversible movement from the off position to the on position, movement of the trigger controlling the pneumatic communication of a pneumatic supply with the means for opening the first and second valves to actuate the rotor means.

32. The spray gun of claim 30, further comprising:
   a pneumatic slide chamber formed within the housing and having a first slide chamber portion and a second slide chamber portion;
   a slide piston slidably mounted within the slide chamber and separating the first and second slide chamber portions; and
   linkage means linking the slide piston to the rotor means, wherein:
   movement of the actuating means controls the pneumatic communication of a pneumatic supply with the pneumatic slide chamber, the actuating means alternately placing the pneumatic supply in pneumatic communication with the first slide chamber portion when the actuating means is in the off position, forcing the slide piston toward the second slide chamber portion and maintaining the rotor means in the off position, and placing the pneumatic supply in pneumatic communication with the second slide chamber portion when the actuating means is in the on position, forcing the slide piston toward the first slide chamber portion and rotating the rotor means through the intermediate position and to the on position.

33. The spray gun of claim 29, further comprising a distributor disposed within the housing, the first and second fluid streams flowable from the first and second valves through the distributor for distributing the second fluid stream within the first fluid stream and then flowing into the means for mixing the first and second fluid streams.

34. A spray gun for mixing a first fluid stream with a second fluid stream and discharging a mixed fluid stream, comprising:

a valve housing including a first valve and second valve for controlling the flow of the first and second fluid streams, respectively, through the valve housing;

control means detachably mounted to the valve housing for controlling the opening of the first and second valves; and a mixer detachably mounted to the valve housing for mixing the first fluid stream and the second fluid stream to discharge a mixed fluid stream, the valve housing, control means, and mixer being selectively detachable to replace worn spray gun components and allow reconfiguration of the spray gun.

35. A method for mixing a first fluid stream and a second fluid stream within a spray gun, comprising:

opening rigidly interconnected first and second valves to start the flow of the first fluid stream and second fluid streams, respectively;

distributing the second fluid stream into the first fluid stream prior to mixing the first and second fluid streams to form a mixed fluid stream; and discharging the mixed fluid stream.

36. The method of claim 35, wherein the step of distributing the second fluid stream into the first fluid stream involves forming concentric, symmetrical first and second fluid streams that are merged to distribute the second fluid stream within the first fluid stream.

37. The method of claim 35, wherein the step of opening rigidly interconnected first and second valves comprises opening the first valve prior to opening the second valve.

* * * * *

UNITED STATES PATENT AND TRADEMARK OFFICE
CERTIFICATE OF CORRECTION

PATENT NO. : 5,143,296
DATED : September 1, 1992
INVENTOR(S) : A. G. Saurwein et al.

It is certified that error appears in the above-identified patent and that said Letters Patent is hereby corrected as shown below:

| | |
|---|---|
| Column 1, line 63 | "several" should read --separate-- |
| Column 3, line 33 | "valve" should read --valves-- |
| Column 3, line 47 | "transversly" should read --transversely-- |
| Column 9, line 8 | "slide" should read --slid-- |
| Column 15, line 34 | "grated" should read --granted-- |
| Column 16, line 60 | "regidly" should read --rigidly-- |
| Column 16, line 64 | after "first" insert --fluid-- |
| Column 17, line 17 | "steam" should read --stream-- |
| Column 17, line 29 | "respectivley" should read --respectively-- |
| Column 18, line 12 | "clima" should read --claim-- |
| Column 18, line 17 | "postion" should read --position-- |
| Column 18, line 52 | after "so" insert --that-- |
| Column 18, line 57 | delete "and" (third occurrence) |
| Column 19, line 18 | "iwth" should read --with-- |

Signed and Sealed this

Ninth Day of November, 1993

*Attest:*

*Attesting Officer*

BRUCE LEHMAN
*Commissioner of Patents and Trademarks*